Oct. 4, 1966  J. F. CONNOR  3,276,500

DUAL TIRE WHEEL ASSEMBLY

Filed March 24, 1965  2 Sheets-Sheet 1

INVENTOR.
JAMES F. CONNOR
BY
Oberlin, Maky & Donnelly
ATTORNEYS

INVENTOR.
*JAMES F. CONNOR*

BY

*Oberlin, Maky & Donnelly*
ATTORNEYS

United States Patent Office 3,276,500
Patented Oct. 4, 1966

3,276,500
DUAL TIRE WHEEL ASSEMBLY
James F. Connor, 3453 W. 128th St.,
Cleveland, Ohio 44111
Filed Mar. 24, 1965, Ser. No. 442,395
18 Claims. (Cl. 152—153)

This invention relates generally, as indicated, to a dual tire wheel assembly and, more particularly, to a wheel assembly of the type which is adapted to support and cool a pair of pneumatic tires, even during high speed turnpike travel.

Heretofore, there have been significant advances in the development of automobile pneumatic tire and wheel constructions for maintaining the temperature of the tires at a safe level, but very little has been done in the way of developing wheel assemblies for cooling dual tires such as are mounted on trucks and buses and the like. This was perhaps due to the fact that trucks and buses were generally not able to travel at high speeds for any length of time, either due to poor road conditions or speed restrictions, and thus overheating of the tires was no real problem. In any event, today there is an ever-increasing number of super highways being built which are heavily traveled by trucks and buses and at high rates of speed. Accordingly, it has become exceedingly important that something be done to keep dual tire wheel assemblies from overheating, or otherwise there may be a great many blow-outs and vehicle fires occasioned by overheated tires, resulting in numerous accidents, to say nothing of the expense, inconvenience, and loss of time.

It is therefore a principal object of this invention to provide novel means for maintaining the temperature of both tires of a dual tire and wheel assembly at a safe level.

Another object is to provide such a dual tire and wheel assembly with a multi-segment heat exchanger, alternate ones of which are in communication with one or the other of the tires for circulating cool air therethrough.

Still another object is to provide such a dual tire wheel assembly with maintenance free, dependable safety arches, one for each tire, the purpose of which is not only to prevent loss of control of the vehicle on which the assembly is mounted in case of a blow-out, but also to permit driving on the blown-out tire for considerable distances to a service area without pinching the tire by the rim.

A further object is to provide such safety arches for a dual tire and wheel assembly with arched flanges having a plurality of openings therethrough for permitting the even circulation of air from the heat exchanger through both tires, even though such openings may not be in direct alignment with the openings in the rim.

Still another object is to provide such a dual tire wheel assembly with removable flanges for facilitating the mounting of conventional tires and safety arches on the wheel rim, and a novel seal between such flanges and the bead of the tires to preclude leakage of air from within the assembly.

Another object is to construct the wheel cover and adjacent flange for the dual tire wheel assembly of one piece, and provide novel means for mounting the same to the wheel rim.

Another object is to provide such a dual tire wheel assembly with tire bead stops inwardly of the wheel assembly flanges against which the tire beads may be firmly held, thereby preventing the bead seals adjacent the flanges from breaking even when the tires hit a curb or other obstruction.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
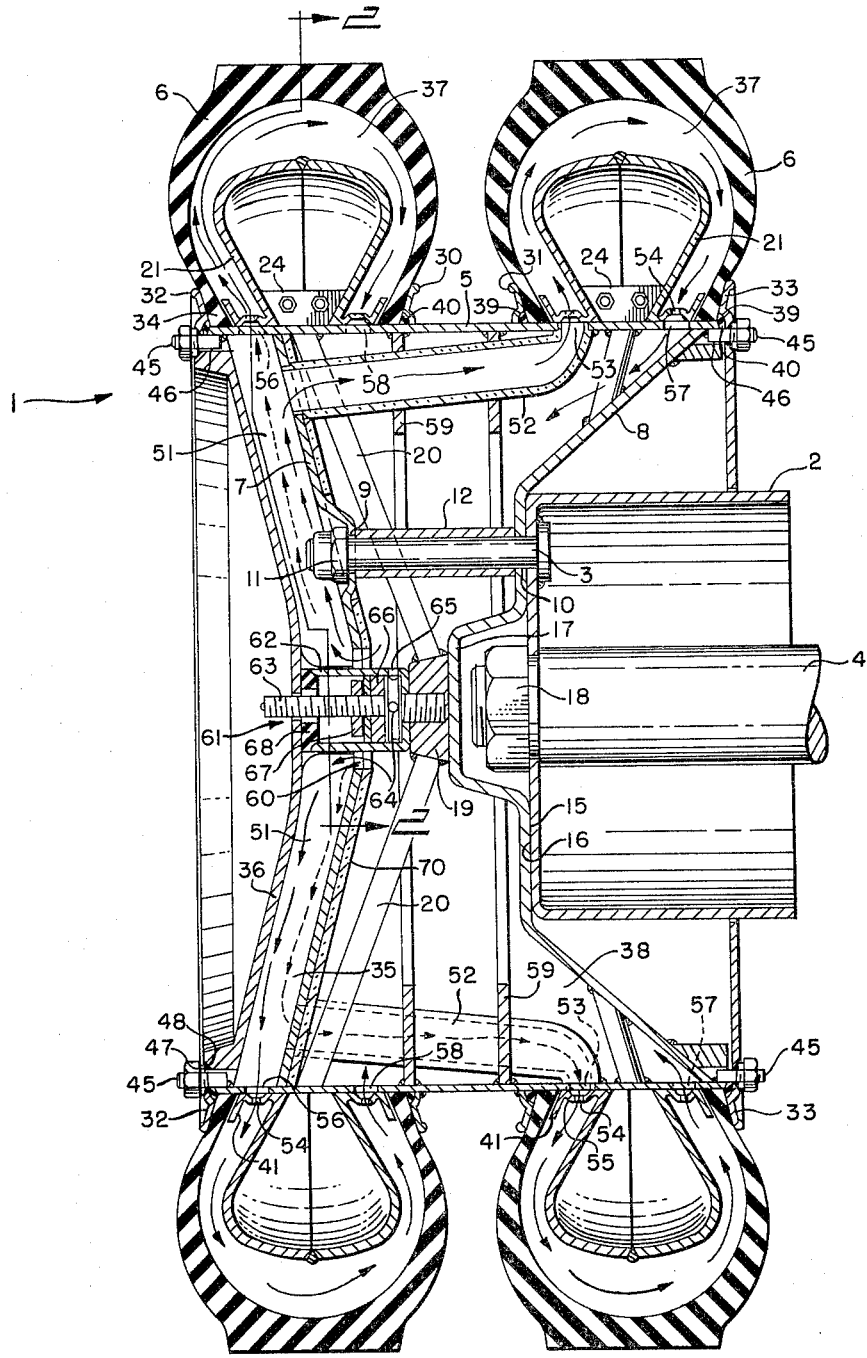
FIG. 1 is a substantially vertical section of a dual tire wheel assembly in accordance with the present invention taken on the plane of the line 1—1 of FIG. 2.

Turning now to the drawing and first of all to FIG. 1, the preferred form of dual tire wheel assembly of the present invention is generally indicated at 1 and is shown mounted on a typical brake drum 2 as by means of a plurality of circumferentially spaced mounting studs 3, such brake drum 2 being supported in conventional manner by a wheel axle 4 of a truck, bus, or similar type vehicle. The wheel of the dual tire wheel assembly 1 includes a generally cylindrical rim 5 which is adapted to support a pair of laterally spaced pneumatic tires 6, in a manner which will be more fully explained hereafter. Welded internally to the rim 5 there is a pair of reinforcing and mounting plates 7 and 8 having a plurality of axially aligned circumferentially spaced holes 9 and 10, respectively, through which the mounting studs 3 are adapted to extend for securing the rim 5 to the brake drum 2 as aforesaid as by tightening the nuts 11. The spacing between the plates 7 and 8 is maintained by spacing collars 12 disposed about the mounting studs 3 between such plates. Preferably, the mounting plate 7 is welded to the rim 5 slightly axially inwardly of the outer end of the rim 5 and is somewhat dish-shaped, while the other mounting plate 8 is welded to the rim 5 adjacent the inner end thereof, such other mounting plate 8 sloping axially outwardly toward the center of the rim and then extending substantially radially to provide a flat face 15 for engagement by the end wall 16 of the brake drum 2. Moreover, the flat face 15 has a bulging central portion 17 for clearing the nut 18 which holds the brake drum 2 on the wheel axle 4.

Projecting axially outwardly from the bulging portion 17 of the mounting plate 8 is a boss 19 to which one of a plurality of circumferentially spaced, radially outwardly extending reinforcing members 20 may be welded, the other end being welded to the rim 5 between the mounting plates 7 and 8.

Within each of the pneumatic tires 6 there is disposed a safety arch 21, preferably comprising two or more sections 22 and 23 (see FIG. 2) assembled within the tires 6 and bolted together through their respective cross members 24 and 25 prior to mounting the tires 6 on the rim 5, after which the tires 6 and arches 21 may be readily slid onto the rim 5 as a single unit. However, it should be understood that the safety arches 21 could be separately mounted on the rim 5 and the pneumatic tires 6 then positioned thereover, if desired, so long as the height of the safety arches 21 is kept to a level that does not interfere with the mounting of the tires 6 thereover.

Because the safety arches 21 are rigid and usually made of metal, they will last a lifetime and be substantially maintenance free. Also, and more important, such safety arches 21 are absolutely reliable, always giving the added support necessary to the pneumatic tires 6 in case of a blow-out to permit the driver of the vehicle to retain control, even should the blow-out occur at high turnpike speeds. This cannot always be said of a pneumatic inner safety tire, however, since it may also become punctured, or it may be under-inflated, or even over-inflated, and may burst from a sudden impact either during or immediately after the blow-out. Thus, while the pneumatic inner safety tire may give a motorist a sense of security, it may in fact fail either before or at the very moment that it is needed.

In addition to giving the desired support to the pneumatic tires 6 which is necessary to maintain the vehicle under control during a blow-out, the safety arches 21 also give sufficient support to the tires to permit driving a considerable distance after a blow-out, if necessary, for servicing without the wheel rim 5 pinching the tire and ruining the same. Moreover, while the safety arches 21 are disclosed as being rigid, they could obviously be made resilient as by forming them from a plurality of circumferentially spaced, radially extending spring ribs.

To hold the pneumatic tires 6 securely in place on the wheel rim 5, there is provided a pair of oppositely directed annular flanges 30 and 31 welded to the rim 5 adjacent the axial center thereof, and a pair of annular flanges 32 and 33 removably attached to the ends of the rim 5 with the spacing between the flanges 30, 32 and 31, 33 being approximately equal to the distance between the tire beads 34. The end flanges 32 and 33 are removable to facilitate the mounting of the tires 6 and safety arches 21 on the rim 5.

Cooling of the tires 6 of the dual tire wheel assembly 1 is accomplished by circulating cool air from within an outer cooling chamber 35 defined between the mounting plate 7 and a cover member 36 secured to the outer end of the wheel rim 5 through the toroidal chamber 37 of the pneumatic tires 6 and back into an inner chamber 38 defined between the mounting plates 7 and 8, from whence the circulated air is again directed back into the outer chamber 35 for further cooling prior to being recirculated through the tires 6. Accordingly, it is necessary that the pneumatic tires 6 be of the tubeless type and that there be effective seals between the beads 34 of the times 6 and the wheel rim 5 and also between the cover member 36 and the rim 5. Such a seal between the beads 34 and rim 5 is achieved by providing annular grooves 39 in the flanges 30–33 adjacent the beads 34 and rim 5 and pressing gaskets 40 in the form of a packing made from graphited cord of about one-eighth inch in diameter, for example, into such grooves. Not only do the grooves 39 assure that the gaskets 40 will be located in the desired position in engagement with the tire beads and rim after assembly, but such grooves also hold the gaskets in place during assembly. The gaskets 40 may be held within the grooves 39 by an adhesive, such as "Permatex," if desired.

Four annular stop rings 41 are located on the rim 5 inwardly of the flanges 30–33 by a distance approximately equal to the width of the tire beads 34, such stop rings 41 either being formed integral with the safety arches 21 as shown in FIG. 1 or welded directly to the rim 5. These stop rings 41 provide a positive stop for firmly securing the tire beads 34 against the pressure exerted thereon by the gaskets 40. Accordingly, the bead seals will not break even should the tires 6 hit large bumps, curbs, or other such obstructions.

As clearly shown in FIG. 1, the mounting nuts 11 are protected from the weather by the cover member 36. Accordingly, it is necessary that the cover member 36 be removably mounted on the rim 5 to permit access to the nuts 11 for removing the tire and wheel assembly 1 from the brake drum 2. Moreover, as previously indicated, it is desirable that the end flanges 32 and 33 be removable for ease in mounting the safety arches 21 and tires 6 on the rim 5. Accordingly, in the preferred form of the invention disclosed herein, the cover member 36 and outer flange 32 are stamped in one piece and attached to the rim 5 as a single unit by passing a plurality of studs 45 welded to the rim 5 around the inner periphery thereof through aligned apertures 46 in the flange 32. The flange 33 may be attached in the same manner. Moreover, since the cover member 36 defines one wall of the chamber 35, it is preferred that a seal in the form of a pliable cone-shaped washer 47 be disposed in a counterbore 48 of the apertures 46 through which the studs 45 extend to prevent air within the chamber 35 from escaping.

Figure 2:
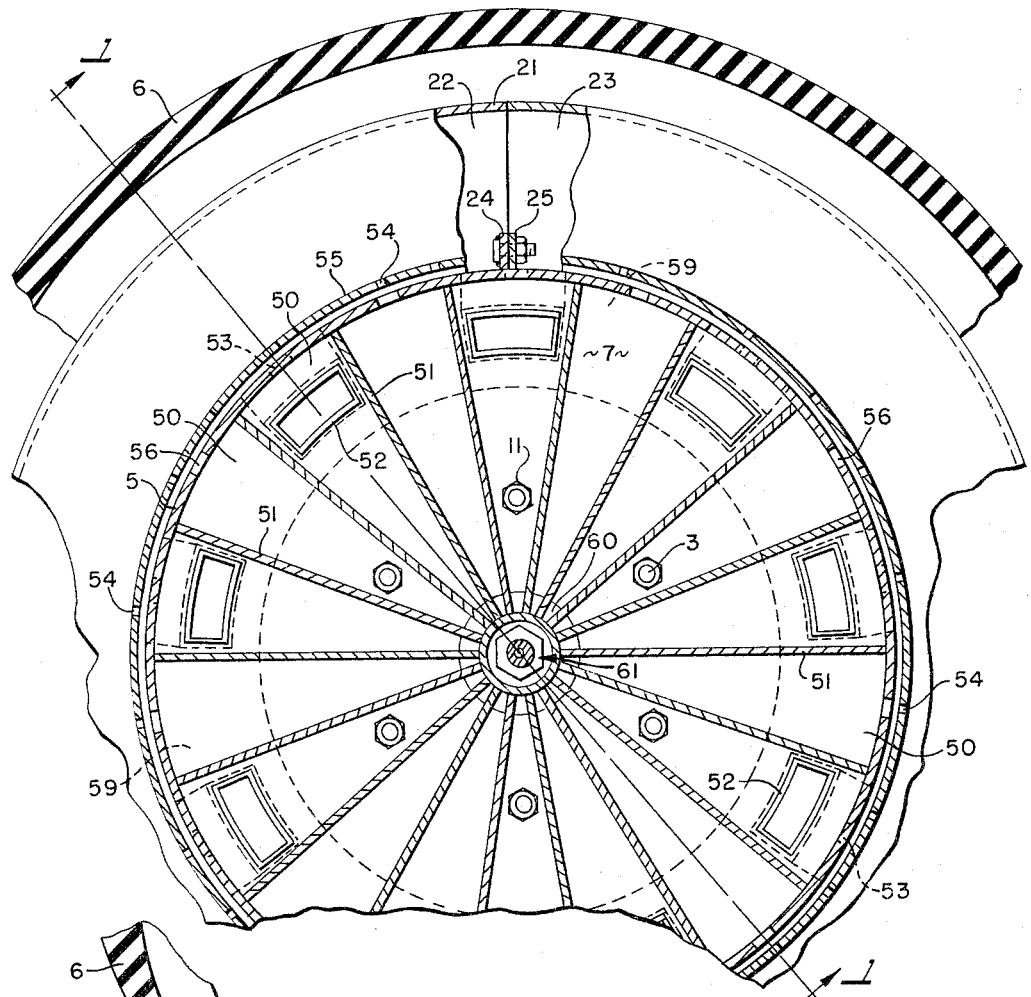
FIG. 2 is a vertical section of the dual tire wheel assembly of FIG. 1 taken on the plane of the line 2—2 of FIG. 1.

The outer chamber 35 is divided into a plurality of segments 50 (see FIG. 2) by a series of radially extending cooling vanes or fins 51 which extend axially from the mounting plate 7 to the cover member 36 and radially from the central portion of the wheel assembly 1 to the inner periphery of the rim 5, such fins 51 being attached to the plate 7 as by welding. Referring further to FIG. 2, while the number of segments 50 may be varied as desired, the chamber 35 is shown as being divided into eighteen segments with insulated tubes 52 connecting every other segment with a series of radially aligned and circumferentially spaced apertures 53 in the rim 5 in fluid communication with the toroidal chamber 37 of the inner tire 6 via circumferentially spaced smaller apertures 54 in the flange 55 of the associated safety arch 21 which connects one of the stop rings 41 to such safety arch. The insulated tubes 52 may be held in position by any suitable means, such as the annular members 59 shown or straps and the like encircling the tubes and having their ends attached to the rim 5. The remaining alternate segments 50 are in communication with the toroidal chamber 37 of the outer tire 6 through radial and circumferentially spaced apertures 56 in the rim 5 via apertures 54 in the flange 55 associated with the outer safety arch 21.

The toroidal chambers 37 of the tires 6 on the side of the safety arches 21 opposite the apertures 53, 56 are in fluid communication with the inner chamber 38 via apertures 54 in the other flange 55 of the safety arches 21 and radial and circumferentially spaced apertures 57 and 58 in the rim 5. Moreover, the chambers 35 and 38 are in fluid communication with each other via a central passageway 60 in the mounting plate 7. Accordingly, not only must the tires 6 be inflated to the desired pressure, but the chambers 35 and 38 must also be inflated to the same pressure.

The inflation valve 61 for inflating the assembly 1 is preferably threaded to the boss 19 at the center of the wheel where it will not be affected by the flexing of the tires or damaged or disturbed when the dual tire and wheel assembly 1 is removed from the brake drum 2. The valve 61 consists of a cup-shaped element 62 in which there is disposed the valve stem 63 the base of which has a plurality of radially extending apertures 64 communicating with the inner chamber 38 via apertures 65 in the element 62. Adjacent the base of the valve stem 63 there is provided a gasket 66 and nut and washer assembly 67 providing an air seal between the walls of the element 62 and the inner chamber 38. Also, there is provided a seal 68 adjacent the mouth of the element 62 and the cover member 36.

The cover member 36 is made of aluminum or other material having high thermo-conductivity, and the plate 7 has a layer of insulation 70 laminated to the inner surface thereof. Thus, the outer chamber 35 will act as a heat exchanger for the cooling of air flowing therethrough The fins 51 within the chamber 35 likewise facilitate the cooling of the air therein. Also, such fins 51 trap the air within the chamber 35 and force it radially outwardly as it cools into the associated toroidal chambers 37 of the tires 6 for circulation therethrough back into the chamber 38, from whence the air passes back into the outer chamber 38 through the passageway 60 for recooling prior to being recirculated.

Figure 3:
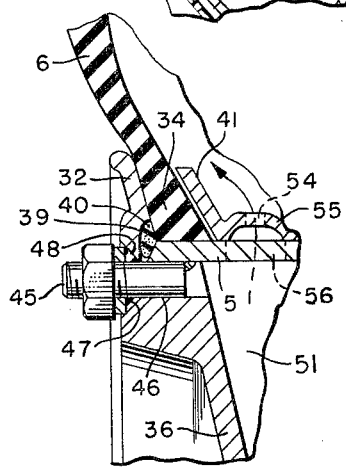
FIG. 3 is an enlarged fragmentary vertical section of the integral flange and cover of the assembly illustrated in FIG. 1, showing in detail the manner in which such flange and covers are mounted to the rim of the assembly.

As perhaps best seen in FIGS. 1 and 3, the flanges 55 of the safety arches 21 are themselves arched and the aperchamber through one set of apertures for each tire into said tires and through the other set of apertures for each tire back to said air chamber when said wheel and pneumatic tires are rotating and the air in said tires is heated, an insulated plate disposed in said air chamber dividing said air chamber into two separate compartments, one of said compartments containing said means to cause a continuous flow of air as aforesaid, including a plurality of circumferentially spaced, radially extending vanes in said one compartment, said vanes dividing said one compartment into a plurality of segments, and insulated tube means for communicating alternate segments of said one compartment with one set of apertures for one of said tires, the remainder of said segments being in communication with one set of apertures for the other of said tires.

10. In combination, a wheel and a pair of pneumatic tires mounted on said wheel, said wheel including a rim, means defining an air chamber within said rim, said rim having two sets of circumferentially spaced apertures communicating the interior of each of said pneumatic tires with said air chamber, means in said air chamber operative to cause a continuous flow of air from within said air chamber through one set of apertures for each tire into said tires and through the other set of apertures for each tire back to said air chamber when said wheel and pneumatic tires are rotating and the air in said tires is heated, an insulated plate disposed in said air chamber dividing said air chamber into two separate compartments, one of said compartments containing said means to cause a continuous flow of air as aforesaid, a cover member which defines with said insulated plate said one compartment, means for removably mounting said cover member to said wheel, and a pair of annular flanges projecting radially outwardly beyond said rim adjacent the ends thereof for retaining said pneumatic tires in place, one of said flanges being formed integral with said cover member, said means for removably mounting said cover member to said wheel comprising a plurality of circumferentially spaced stud members projecting outwardly from said rim through openings in said one flange, pliable cone-shaped washer means disposed in said apertures, and nut means threadedly engaging said stud members and operative to force said washer means into said openings to form a fluid-tight seal around said stud members.

11. A dual tire and wheel assembly comprising a rim, a plurality of laterally spaced pneumatic tires mounted on said rim, a safety arch disposed within each of said pneumatic tires, means within said rim defining an air chamber, said rim having two sets of circumferentially spaced air passages communicating the interior of each of said pneumatic tires with said air chamber, said two sets of air passages for each tire being located exteriorly of the sides of said arches and interiorly of the tire beads, heat exchanger means in said air chamber operative to cool the air in said air chamber, means in said air chamber operative to cause such cool air to flow through one set of air passages for each tire into said tires and through the other set of air passages for each tire back to said air chamber when said dual tire and wheel assembly is rotated, a pair of annular flanges projecting radially outwardly beyond said rim adjacent the ends thereof for retaining said pneumatic tires in place, and means for removably mounting said end flanges to said wheel, thereby permitting removal of said flanges to facilitate mounting of said tires and safety arches on said rim, said means which defines said air chamber including a cover member formed integral with one of said end flanges, and said means for removably mounting said one end flange to said wheel comprising a plurality of circumferentially spaced stud members projecting outwardly from said rim through openings in said one flange, pliable cone-shaped washer means disposed in said apertures, and nut means threadedly engaging said stud members operative to force said washer means into said openings to form a fluid-tight seal around said stud members.

12. In combination, a wheel and a pair of pneumatic tires mounted on said wheel, said wheel including a rim, means defining two separate air chambers within said rim in communication with each other, a plurality of circumferentially spaced, radially extending vanes in one of said air chambers dividing said one air chamber into a plurality of separate segments in communication with the other of said air chambers, a first set of circumferentially spaced apertures in said rim communicating the interior of one of said pneumatic tires with selected ones of said segments, a second set of circumferentially spaced apertures in said rim in communication with the other pneumatic tire, tube means communicating others of said segments with said second set of apertures, and third and fourth sets of circumferentially spaced apertures in said rim communicating both of said pneumatic tires with said other air chamber.

13. In combination, a wheel and a pneumatic tire mounted on said wheel, said wheel comprising a rim, a pair of laterally spaced annular plate members disposed in said rim and welded thereto around their peripheries to form a fluid tight first chamber therebetween, a pair of annular end flanges projecting radially outwardly beyond said rim for retaining said pneumatic tire in place, means for removably mounting one of said end flanges to facilitate mounting of said tire on said rim, a cover member formed integral with said one end flange and laterally spaced from one of said annular plate members to define therewith a second fluid-tight chamber, said rim having two sets of circumferentially spaced air passages extending therethrough for communicating the interior of said tire with said first and second chambers, means in said second chamber operative to cause a continuous flow of air from within said second chamber through one set of air passages into said tire and through the other set of air passages back to said first chamber, and means for communicating said first chamber with said second chamber.

14. The assembly of claim 13 further comprising a safety arch surrounding said rim within said tire, said safety arch consisting of a plurality of sections secured together.

15. The assembly of claim 14 wherein said safety arch is a spring rib safety arch.

16. A tire and wheel assembly comprising a rim, a pneumatic tire mounted on said rim, means within said rim defining an air chamber, said rim having two sets of circumferentially spaced air passages communicating the interior of said pneumatic tire with said air chamber, heat exchanger means in said air chamber operative to cool the air in said air chamber, and means in said air chamber operative to cause such cool air to flow through one set of air passages into said tire and through the other set of air passages back to said air chamber when said tire and wheel assembly is rotated, a pair of annular flanges projecting radially outwardly beyond said rim for retaining said pneumatic tire in place, and means for removably mounting one of said annular flanges to said wheel, thereby permitting removal of said one flange to facilitate mounting of said tire on said rim, including a plurality of circumferentially spaced stud members projecting outwardly from said rim through openings in said one flange, pliable cone-shaped washer means disposed in said apertures, and nut means threadedly engaging said stud members operative to force said washer means into said openings to form a fluid-tight seal around said stud members.

17. A tire and wheel assembly comprising a rim, a pneumatic tire mounted on said rim, means within said rim defining an air chamber, said rim having two sets of circumferentially spaced air passages communicating the interior of said pneumatic tire with said air chamber, heat exchanger means in said air chamber operative to cool the air in said air chamber, and means in said air chamber operative to cause such cool air to flow through one set of air passages into said tire and through the other set of air passages back to said air chamber when said tire and tures 54 are in the crown of the arch. Accordingly, even though the apertures 54 in the flanges 55 may not be in alignment with the associated apertures 53, 56, 57, and 58 in the rim 5, the cool air from the outer chamber 35 will still be permitted to pass through the apertures 54 in the flanges 55 and be distributed quite evenly around the inner circumference of the tires 6. Thus, no care need be exercised in aligning the smaller apertures 54 in the flanges 55 with the apertures in the rim 5.

In operation, the dual tire wheel assembly 1 is initially inflated through the inflation valve 61 to the desired pressure, after which the air within the assembly remains substantially stationary when the wheels are not turning. However, when the vehicle is driven, the air within the toroidal chambers 37 of the tires 6 will eventually heat up and become less dense than the air in the chambers 35 and 38. When this happens, the air will tend to flow radially inwardly through the apertures 54 in the flanges 55 and the apertures 57 and 58 in the rim 5 and thereby force the air from the chamber 38 into the chamber 35 through the passageway 60. This flow will also be induced by the cooler air in chamber 35 being displaced radially outwardly by the fins 51 and the centrifugal force acting on the cooler air in the chamber 35.

The air will flow in the manner indicated by the arrows in FIG. 1, the air in the segments 50 having the insulated tubes 52 connected thereto being directed to the inner tire 6 for circulation therethrough and the air in the other segments being directed to the outer tire 6 for circulation therethrough. Since the air which is directed to the inner tire 6 has a greater distance to travel than the air directed to the outer tire, it encounters a greater resistance to flow. To overcome such increased resistance, the segments 50 with which the insulated tubes 52 are associated may have a slightly greater volume so that the flow into such segments will be slightly greater.

The heated air within the tires 6 displaced by the incoming cooler air from the chamber 35 is directed to the inner chamber 38 where it displaces air from within the chamber 38 into the outer chamber 35 for further cooling and recirculation through the tires. As is readily apparent, this continued circulation of the cooler air from the chamber 35 through the tires 6 and back into the chamber 38 will continue so long as the air is being heated in the tire and the tire and wheel assembly is rotating at considerable speed.

From the above discussion, it can now be seen that the dual tire wheel assembly of the present invention is very effective in keeping the tires cool, even when being driven at high rates of speed over sustained periods of time. As a matter of fact, the faster the wheel assembly is being rotated, the greater the rate of air circulation through the tires and thus the greater the cooling effect. Moreover, the assembly is of extremely simple construction and there are no moving parts to wear out or replace. Also, the assembly is provided with a completely reliable safety device which may be used in conjunction with all types of pneumatic tire and wheel assemblies.

Other modes of applying the principles of the invention may be employed, change being made as regards the details described, provided the features stated in any of the following claims or the equivalent of such be employed.

I therefore, particularly point out and distinctly claim as my invention:

1. In combination, a wheel and a pair of pneumatic tires mounted on said wheel, said wheel comprising a rim, a pair of laterally spaced annular plate members disposed in said rim and welded thereto around their peripheries to form a fluid tight first chamber therebetween, a pair of annular end flanges projecting radially outwardly beyond said rim adjacent the ends thereof for retaining said pneumatic tires in place, a safety arch disposed within each of said pneumatic tires around said rim, means for removably mounting said end flanges to said wheel, thereby permitting removal of said end flanges to facilitate mounting of said tires and safety arches on said rim, a cover member formed integral with one of said end flanges and laterally spaced from one of said annular plate members to define therewith a second fluid-tight chamber, said rim having two sets of circumferentially spaced air passages extending through said rim exteriorly of the sides of both of said arches and interiorly of the beads of both of said tires, means in said second chamber operative to cause a continuous flow of air from within said second chamber through one set of air passages for each tire into said tires and through the other set of air passages for each tire back to said first chamber, and means for communicating said first chamber with said second chamber, said means to cause a continuous flow of air including a plurality of circumferentially spaced, radially extending vanes in said second chamber dividing said second chamber into a plurality of segments, such segments being in communication with one or the other of said one set of air passages for each tire.

2. The combination of claim 1 further comprising insulated tube means for communicating alternate segments with said one set of air passages for one of said tires.

3. The combination of claim 2 further comprising seal means between the beads of said tires and said rim and between said cover member and said rim to prevent the escape of air from within said first and second chambers and said pneumatic tires.

4. A dual tire and wheel assembly comprising a rim, a pair of laterally spaced pneumatic tires mounted on said rim, a safety arch disposed within each of said pneumatic tires, means within said rim defining an air chamber, said rim having two sets of circumferentially spaced air passages communicating the interior of each of said pneumatic tires with said air chamber exteriorly of the sides of said arches and interiorly of the tire beads, heat exchanger means in said air chamber operative to cool the air in said air chamber and means in said air chamber operative to cause such cool air to flow through one set of air passages for each tire into said tires and through the other set of air passages for each tire back to said air chamber when said dual tire and wheel assembly is rotated, two pairs of annular flange means projecting radially outwardly beyond said rim for retaining said pneumatic tires in place, said flange means being provided with annular grooves facing the beads of said tires and located adjacent said rim for receipt of a packing means therein to form a fluid-tight seal between said tires and rim.

5. The assembly of claim 4 wherein said packings are made from graphited cord adhesively held in said grooves.

6. The assembly of claim 4 further comprising annular stop ring means located on said rim inwardly of said annular flanges operative to provide a positive stop for firmly securing the beads of said tires against the pressure exerted thereon by said packings, thereby precluding leakage of air from said tires even when said tires hit an obstruction.

7. The assembly of claim 6 wherein said annular stop ring means are formed integral with the walls of said safety arches.

8. The assembly of claim 6 wherein arched flanges interconnect said annular stop ring means with the adjacent sides of said safety arches, said arch flanges overlying said sets of circumferentially spaced air passages for each of said tires, and there are a plurality of circumferentially spaced apertures in the crown of said arched flanges for permitting the passage of air into and out of the interior of said tires even though said apertures are not in direct alignment with said air passages in said rim.

9. In combination, a wheel and a pair of pneumatic tires mounted on said wheel, said wheel including a rim, means defining an air chamber within said rim, said rim having two sets of circumferentially spaced apertures communicating the interior of each of said pneumatic tires with said air chamber, means in said air chamber operative to cause a continuous flow of air from within said air wheel assembly is rotated, a pair of annular flange means projecting radially outwardly beyond said rim for retaining said pneumatic tire in place, each of said flange means being provided with an annular groove facing the adjacent bead of said tire and located adjacent said rim, and packing means in said grooves adapted to form a fluid-tight seal between said tire beads and rim.

18. The assembly of claim 17 further comprising annular stop ring means located on said rim inwardly of said annular flanges operative to provide a positive stop for firmly securing the beads of said tire against the pressure exerted thereon by said packings, thereby precluding leakage of air from said tire even when said tire hits an obstruction, a safety arch disposed within said pneumatic tire, arched flanges interconnecting said annular stop ring means with the adjacent sides of said safety arch, said arched flanges overlying said sets of circumferentially spaced air passages, and a plurality of circumferentially spaced apertures in the crown of said arched flanges for permitting the passage of air into and out of the interior of said tire even though said apertures may be out of alignment with said air passages in said rim.

References Cited by the Examiner
UNITED STATES PATENTS 2,074,284 3/1937 Stevenson _____ 152—158 X
3,113,604 12/1963 Connor _____ 152—153

ARTHUR L. LA POINT, *Primary Examiner.*

C. W. HAEFELE, *Assistant Examiner.*